(12) United States Patent
Buse et al.

(10) Patent No.: US 9,133,728 B2
(45) Date of Patent: Sep. 15, 2015

(54) FLUID PRESSURE REVERSING VALVE

(75) Inventors: Werner Buse, Kaarst (DE); Rolf Lappan, Cologne (DE); Rolf Dohrmann, Kaarst (DE); Franz-Josef Schnelker, Neuss (DE); Christoph Sadowski, Bochum (DE)

(73) Assignee: PIERBURG GMBH, Neuss (DE)

( * ) Notice: Subject to any disclaimer, the term of this patent is extended or adjusted under 35 U.S.C. 154(b) by 295 days.

(21) Appl. No.: 13/805,669

(22) PCT Filed: May 27, 2011

(86) PCT No.: PCT/EP2011/058714
§ 371 (c)(1),
(2), (4) Date: Dec. 20, 2012

(87) PCT Pub. No.: WO2011/160917
PCT Pub. Date: Dec. 29, 2011

(65) Prior Publication Data
US 2013/0099144 A1  Apr. 25, 2013

(30) Foreign Application Priority Data
Jun. 25, 2010 (DE) .......................... 10 2010 025 171

(51) Int. Cl.
*F16K 31/06* (2006.01)
*F16K 11/044* (2006.01)
*F16K 11/07* (2006.01)
*F01D 21/18* (2006.01)

(52) U.S. Cl.
CPC ............ *F01D 21/18* (2013.01); *F16K 31/0627* (2013.01); *F16K 31/0693* (2013.01)

(58) Field of Classification Search
CPC ............... F16K 31/0627; F15B 13/044; F01L 2001/3443

USPC ............ 137/625.25, 625.27, 625.65, 625.67; 251/129.07
See application file for complete search history.

(56) References Cited

U.S. PATENT DOCUMENTS

| | | | | |
|---|---|---|---|---|
| 2,934,090 A | * | 4/1960 | Kenann et al. | 137/625.5 |
| 3,951,166 A | * | 4/1976 | Whitener | 137/625.27 |
| 4,074,700 A | * | 2/1978 | Engle | 137/625.27 |
| 5,184,773 A | * | 2/1993 | Everingham | 237/12.3 B |

(Continued)

FOREIGN PATENT DOCUMENTS

| | | |
|---|---|---|
| DE | 25 28 873 A1 | 1/1976 |
| DE | 35 025 89 A1 | 8/1986 |

(Continued)

*Primary Examiner* — Marina Tietjen
*Assistant Examiner* — Seth W MacKay-Smith
(74) *Attorney, Agent, or Firm* — Norman B. Thot

(57) ABSTRACT

A fluid pressure reversing valve includes a housing, a coil carrier, a coil wound on the coil carrier, a bearing, an armature axially displaceable in the bearing, a core, a flux guiding device, a first connection bore, a control chamber, a first valve seat. A connection sleeve comprises a second connection bore, a first valve seat for a valve element of the armature, and a second valve seat for the valve element of the armature. The connection sleeve communicates with a fluid to be controlled. A third connection bore is connected with the control chamber. A valve element abuts against the first valve seat in a first position so as to form a connection between the first connection bore and the third connection bore, and against the second valve seat in a second position so as to form a connection between the third connection bore and the second connection bore.

6 Claims, 1 Drawing Sheet

(56) References Cited

U.S. PATENT DOCUMENTS

| | | | | |
|---|---|---|---|---|
| 5,443,241 | A | * | 8/1995 | Odaira et al. ............ 251/129.07 |
| 5,771,933 | A | | 6/1998 | Akamatsu et al. |
| 5,975,064 | A | * | 11/1999 | Krimmer et al. ......... 123/568.18 |
| 6,000,677 | A | * | 12/1999 | Cook et al. ............... 251/129.07 |
| 6,315,268 | B1 | | 11/2001 | Cornea et al. |
| 6,701,959 | B1 | | 3/2004 | Flynn et al. |
| 7,497,232 | B2 | * | 3/2009 | Muller et al. ............ 137/625.26 |
| 7,523,763 | B2 | * | 4/2009 | Katsuta et al. ........... 137/625.65 |
| 7,686,038 | B2 | * | 3/2010 | Chavanne ................ 137/625.65 |
| 2006/0261301 | A1 | | 11/2006 | Eiser et al. |
| 2006/0278838 | A1 | | 12/2006 | Chavanne |
| 2008/0042090 | A1 | | 2/2008 | Zweber |
| 2008/0196777 | A1 | * | 8/2008 | Ross et al. ............... 137/625.65 |
| 2010/0107669 | A1 | | 5/2010 | Wada |
| 2011/0226975 | A1 | * | 9/2011 | Buse et al. ............... 251/129.15 |
| 2011/0260085 | A1 | | 10/2011 | van der Zee et al. |

FOREIGN PATENT DOCUMENTS

| | | |
|---|---|---|
| DE | 197 16 185 A1 | 10/1998 |
| DE | 199 34 846 A1 | 1/2001 |
| DE | 10 2005 061 509 A1 | 11/2006 |
| DE | 10 2005 034 938 A1 | 2/2007 |
| DE | 10 2005 049 124 A1 | 4/2007 |
| DE | 601 19 406 T2 | 4/2007 |
| DE | 10 2007 009 400 A1 | 8/2008 |
| DE | 10 2007 025 567 A1 | 12/2008 |
| DE | 10 2008 048 597 A1 | 4/2010 |
| DE | 10 2008 060 889 A1 | 6/2010 |
| EP | 1 734 297 A1 | 12/2006 |
| JP | 48-042335 | 12/1973 |
| JP | 9-222180 A | 8/1997 |
| JP | 10-2442 A | 1/1998 |
| JP | 2004-132543 A | 4/2004 |
| JP | 2006-71003 A | 3/2006 |
| WO | WO 2010/056111 A1 | 5/2010 |

\* cited by examiner

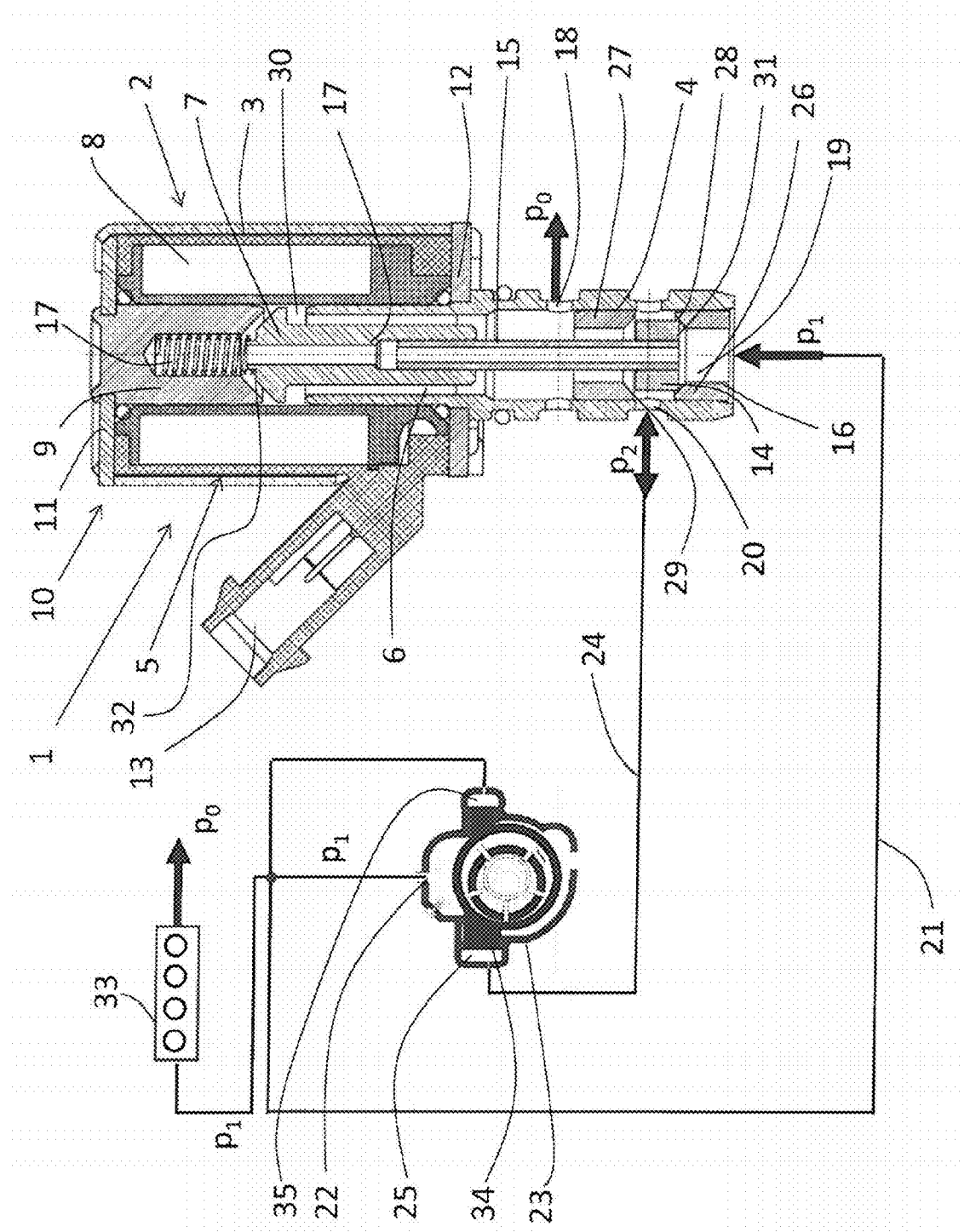

FLUID PRESSURE REVERSING VALVE

CROSS REFERENCE TO PRIOR APPLICATIONS

This application is a U.S. National Phase application under 35 U.S.C. §371 of International Application No. PCT/EP2011/058714, filed on May 27, 2011 and which claims benefit to German Patent Application No. 10 2010 025 171.2, filed on Jun. 25, 2010. The International Application was published in German on Dec. 29, 2011 as WO 2011/160917 A1 under PCT Article 21(2).

FIELD

The present invention relates to a fluid pressure reversing valve (pressure-control valve) comprising a housing accommodating a coil wound upon a coil carrier, an armature axially displaceable in a bearing, a core and a flux guiding means, which comprises a first connection bore and a connection sleeve in communication with the fluid to be controlled, the connection sleeve comprising a second connection bore and at least one valve seat for a valve element of the armature.

BACKGROUND

Fluid pressure reversing valves are in particular used in hydraulic actuators, in controls for automatic transmissions of motor vehicles, or in combination with a pressure or flow-rate controlled motor oil pump. These may be so-called on/off-valves or so-called modulator valves that are adapted for an infinitely variable control of a flow rate. An on/off-control described in DE 197 16 185 A1 is provided as an example in this context. Here, an electromagnetically-driven armature cooperates with a valve seat to establish fluid communication between a connection sleeve and a connection bore. The armature may cooperate with compression springs and the electromagnetic drive to provide a sealed closure in the off position. High demands must therefore be made to the solenoid drive and the manufacturing accuracy of the fluid pressure reversing valve, which naturally results in high manufacturing and assembling effort. Such a fluid pressure reversing valve additionally allows only one fluid flow direction, with the effect that, for applications that require a fluid flow in two directions, additional measures must be taken to realize this possibility.

SUMMARY

An aspect of the present invention is to provide a fluid pressure reversing valve for which functionality is provided while keeping manufacturing and assembling effort as low as possible, and to also provide a fluid flow in different directions.

In an embodiment, the present invention provides a fluid pressure reversing valve includes a housing, a coil carrier, a coil wound on the coil carrier, a bearing, an armature axially displaceable in the bearing, a core, a flux guiding device, a first connection bore, a control chamber, a first valve seat. A connection sleeve comprises a second connection bore, a first valve seat for a valve element of the armature, and a second valve seat for the valve element of the armature. The connection sleeve is configured to communicate with a fluid to be controlled. A third connection bore is connected with the control chamber. A valve element is configured to abut against the first valve seat in a first position so as to form a connection between the first connection bore and the third connection bore, and to abut against the second valve seat in a second position so as to form a connection between the third connection bore and the second connection bore. It thereby becomes possible to control a hydraulic actuator element such as an adjusting device of an oil pump in a simple manner. Other additional elements are no longer required.

BRIEF DESCRIPTION OF THE DRAWINGS

The present invention is described in greater detail below on the basis of embodiments and of the drawing in which:

FIG. 1 shows a sectional view of an embodiment of a fluid pressure reversing valve, with the integration into an oil circuit being shown schematically for clarification of operation.

DETAILED DESCRIPTION

In an embodiment of the present invention, the housing can be built from a lower part and an upper part, where the lower part comprises the connection sleeve and the connection bore and is arranged in the upper part of the housing either positively or non-positively, where the bearing bush for the armature is provided in the part of the connection sleeve facing the core, and the valve seats for the valve element are arranged in the opposite part of the connection sleeve. The valve seats may be configured as bush elements having chamfered abutment faces oriented towards the valve element to provide a linear and thus sealed contact between the valve seat and the valve element.

In an embodiment of the present invention, the armature can, for example, be formed as a hollow member connected with the valve element through a tube element, such that a valve interior holds a pressure prevailing at the second connection bore. To further simplify the assembly of the fluid pressure reversing valve, it is feasible for the armature, the tube element and the valve element to be configured as multiple parts, with the tube element being pressed into the armature. It is thereby further possible to adjust the so-called residual air gap (distance between the armature and the core in the energized state) during assembly, In an embodiment of the present invention, an effective surface of the valve element can, for example, be smaller or larger than the effective surface of the armature. In the present embodiment, in which the motor oil pressure $p_1$ prevails at the second connection bore, the opening function can be assisted if the effective surface of the valve element is larger than the effective surface of the armature. If it is desired to assist the closing function, the effective surface of the valve element can be smaller than the effective surface of the armature. In order to provide an unimpeded flow through the third connection bore, at least one of the two bush elements can be offset backward with respect to the third connection bore.

The following is a detailed description of an embodiment of the present invention with reference to the accompanying drawing.

The fluid pressure reversing valve 1 of the present invention comprises a housing 2 which is built substantially from an upper part 3 and a lower part 4. The upper part 3 comprises an electromagnetic drive unit 5 acting upon an armature 7 arranged for axial displacement in a bearing bush 6. The electromagnetic drive unit 5 substantially comprises a coil 8, a core 9 and a flux guiding means 10 that is formed by a backiron 11 and a yoke 12. The housing 2, which is made of a plastic material, further comprises a plug 13 for connection with a control module known per se and not illustrated herein. The electromagnetic drive unit 5 acts on the armature 7 which has a valve element 14 at its end averted from the core 9. In the present instance, the valve element 14 is connected by means of a connection element 15 which in the present instance is in the form of a tube element 15. The tube element 15 is a drawn tube of calibrated outer diameter. The inner diameter can be neglected, since it merely serves pressure equalization purposes in the context of the armature 7. In the present case, the armature 7, the valve element 14 and the tube element 15 are designed as multiple parts. A spring 17 biases the armature 7 in the closing direction with respect to the core 9. The spring 17 is guided in the core 9. The tube element 15 is pressed into the armature 7, which armature is hollow. The valve element is pressed onto the end of the tube element 15 averted from the armature 7. The operations for pressing elements in or on occur during the final assembly of the fluid pressure reversing valve 1. The press connection between the armature 7 and the tube element 15 allows for the adjustment of the so-called "residual air gap" between the armature 7 and the core 9 in the energized state. The valve stroke, which is also important for the functioning of the pressure-control valve 1, can be influenced by the distance over which the valve element 14 is pressed onto the tube element 15.

The bearing bush 6 for the armature 7 is arranged in the lower part 4, the lower part 4 further comprising a first connection bore 18, a second connection bore 19, and a third connection bore 20. The term connection bore may also mean a series of bores in the lower part 4.

The first connection bore 18 leads to a tank (not illustrated in detail) in which atmospheric pressure $p_0$ prevails. The second connection bore 19, provided in the part of the lower part 4 configured as the connection sleeve 16, is connected via a line 21 with the outlet 22 of a consumer 23 to be controlled, which in the present embodiment is an oil pump configured as a variable vane cell pump. Accordingly, a motor oil pressure $p_1$ prevails at the second connection bore. A line 24 connects the third connection bore 20 with a first control chamber 25 of the variable vane cell pump 23. Here, the control pressure $p_2$ prevails. A first bush element 26 and a second bush element 27 are provided in the connection sleeve 16, which have chamfered abutment surfaces 28, 29 forming a first and a second valve seat 28, 29. In combination with the valve element 14, a linear and thereby tight contact between the valve element 14 and the respective valve seat is thus provided. Of course, it is also possible to provide the valve element 14 with correspondingly chamfered surfaces. In the non-energized state, the valve element 14 contacts the first valve seat 28 so that the first connection bore 18 is in fluid communication with the third connection bore 20. In the energized state, the valve element 14 abuts against the second valve seat 29 so that the third connection bore 20 is in fluid communication with the second connection bore 19. In the present embodiment, the first bush element 26 is offset backward with respect to the third connection bore 20 so that an unimpeded flow is provided.

Since the armature 7 and the tube element 15 are hollow in the present embodiment, a connection of an interior 30 to atmospheric pressure $p_1$ is provided via the second connection bore 19. The electromagnetic drive unit 5 is thereby not subjected to different pressures, whereby an exact control of the armature 7 is provided.

In the present embodiment, the effective surface 31 of the valve element 14 is slightly larger than the effective surface 32 with the consequence that the resultant forces in the non-energized state, which result from the presence of the pressure $p_1$, assist the opening force and, and cause a "self-opening" of the pressure-control valve 1 when the motor oil pressure $p_1$ is too high.

The pressure-control valve 1 of the present invention functions as follows. In the present case, a motor oil pump 23, known per se, is to be controlled, which pump is designed as a variable vane cell pump. The variable vane cell pump 23 conveys the motor oil to the motor 33, the excess oil being returned to the tank at atmospheric pressure $p_0$. The motor oil conveyed is at a pressure $p_1$. A maximum delivery volume is achieved at maximum eccentricity of the rotary axis of the variable vane cell pump 23, the eccentricity being obtained by displacement of a slide 34 in the variable vane cell pump 23. A minimum delivery volume is achieved when the rotary axis is centric. The slide 34 cooperates with the first control chamber 25 and a second control chamber 35, with the pressure $p_1$ prevailing in the second control chamber 35 and the pressure $p_2$ prevailing in the first control chamber 25. However, the abutment surface of the slide 34 is larger in the first control chamber 25 so that, when the fluid pressure reversing valve 1 is energized, the slide 34 causes minimum eccentricity and thus the smallest delivery volume. If an increase in eccentricity and thus an increase in delivery volume of the variable vane cell pump 23 are desired, the fluid pressure reversing valve 1 is de-energized and the pressure in the first control chamber 25 is reduced by the fact that oil can flow from the control chamber 25 to the tank via the line 24 and the first connection bore 18. This also provides a fail-safe function which guarantees a large delivery volume even if the fluid pressure reversing valve 1 is defective.

When a reduction in delivery volume is desired, oil flows through the fluid pressure reversing valve 1 and the second connection bore 19 can be communicated with the third connection bore 20 such that the first control chamber 25 is subjected to the motor oil pressure $p_1$ which, in combination with the different surface ratio of the abutment surfaces of the slide 34, provides that a fast displacement of the rotary axis of the variable vane cell pump 23 to the centric position occurs. The pressure-control valve 1 is further used to discharge the leakage oil present due to leaks and movement gaps, in particular at low pressure levels (little eccentricity, low delivery volume).

It should be clear that the present invention is not limited to the number of connections mentioned in the embodiment. It is also conceivable to connect the first connection bore 18 with the motor oil line and to connect the second connection bore 19 with the tank.

The present invention is not limited to embodiments described herein; reference should be had to the appended claims.

What is claimed is:

1. A fluid pressure reversing valve for a consumer comprising a fluid to be controlled, a first consumer control chamber, a second consumer control chamber, and a consumer outlet, the fluid pressure valve comprising:
   a coil carrier;
   a coil wound on the coil carrier;
   a bearing;
   an armature comprising a valve element, the armature being configured to be axially displaceable in the bearing;
   a core;
   a flux guiding device;
   a first connection bore;
   a connection sleeve comprising a second connection bore, a first valve seat for the valve element of the armature, and a second valve seat for the valve element of the armature, the second connection bore being connected with the consumer outlet and with the second consumer control chamber and being configured to communicate with the fluid to be controlled;

a third connection bore connected with the first consumer control chamber; and a housing comprising a lower housing part and an upper housing part, the lower housing part comprising the connection sleeve, the first connection bore, the second connection bore, and the third connection bore, and the lower housing part being arranged in an interlocking manner or in a force-fitting manner in the upper housing part, wherein, the valve element is configured to abut against the first valve seat in a first position so as to form a connection between the first connection bore and the third connection bore, and to abut against the second valve seat in a second position so as to form a connection between the third connection bore and the second connection bore, the bearing bush for the armature is provided in a part of the connection sleeve facing the core, and the first valve seat and the second valve seat are each arranged in an opposite part of the connection sleeve facing away from the core.

2. The fluid pressure reversing valve as recited in claim 1, wherein the first valve seat is provided as a first bush element and the second valve seat is provided as a second bush element, and the first bush element and the second bush element each comprise chamfered abutment surfaces directed towards the valve element.

3. The fluid pressure reversing valve as recited in claim 1, wherein at least one of the first bush element and the second bush element is offset backward with respect to the third connection bore.

4. The fluid pressure reversing valve as recited in claim 1, further comprising a tube element and a valve interior, wherein the armature is hollow and is connected with the valve element via the tube element so that the valve interior has a pressure prevailing at the second connection bore.

5. The fluid pressure reversing valve as recited in claim 4, wherein, the armature, the tube element and the valve element are provided as multiple parts, and the tube element is pressed into the armature.

6. The fluid pressure reversing valve as recited in claim 1, wherein, the valve element has an effective surface and the armature has an effective surface, and the effective surface of the valve element being smaller or larger than the effective surface of the armature.

* * * * *